United States Patent
Sakai et al.

(10) Patent No.: US 8,493,494 B2
(45) Date of Patent: Jul. 23, 2013

(54) IMAGING APPARATUS WITH SUBJECT SELECTING MODE

(75) Inventors: Takenori Sakai, Kyoto (JP); Keisuke Okawa, Osaka (JP); Naomasa Takada, Osaka (JP)

(73) Assignee: Panasonic Corporation, Osaka (JP)

( * ) Notice: Subject to any disclaimer, the term of this patent is extended or adjusted under 35 U.S.C. 154(b) by 377 days.

(21) Appl. No.: 12/645,940

(22) Filed: Dec. 23, 2009

(65) Prior Publication Data

US 2010/0188560 A1 Jul. 29, 2010

(30) Foreign Application Priority Data

Dec. 26, 2008 (JP) .................................. 2008-332547
Dec. 26, 2008 (JP) .................................. 2008-332551

(51) Int. Cl.
*H04N 5/222* (2006.01)
*H04N 5/232* (2006.01)
*G03B 13/00* (2006.01)

(52) U.S. Cl.
USPC ..................................... 348/333.03; 348/349

(58) Field of Classification Search
USPC .............. 348/345, 346, 349, 333.01, 333.02, 348/333.05, 333.11, 77, 78, 333.03
See application file for complete search history.

(56) References Cited

U.S. PATENT DOCUMENTS

| | | | |
|---|---|---|---|
| 6,118,484 A | 9/2000 | Yokota et al. | |
| 7,298,412 B2 * | 11/2007 | Sannoh et al. | 348/348 |
| 7,362,368 B2 * | 4/2008 | Steinberg et al. | 348/349 |
| 7,616,233 B2 * | 11/2009 | Steinberg et al. | 348/222.1 |
| 7,787,025 B2 * | 8/2010 | Sanno et al. | 348/231.3 |
| 7,903,163 B2 * | 3/2011 | Ojima et al. | 348/333.02 |
| 7,920,187 B2 * | 4/2011 | Sanno et al. | 348/252 |
| 7,973,853 B2 * | 7/2011 | Ojima et al. | 348/364 |
| 7,978,261 B2 * | 7/2011 | Ojima et al. | 348/371 |
| 2002/0140814 A1 * | 10/2002 | Cohen-Solal et al. | 348/172 |
| 2005/0104958 A1 * | 5/2005 | Egnal et al. | 348/143 |
| 2008/0273110 A1 * | 11/2008 | Joza et al. | 348/333.05 |
| 2008/0284900 A1 * | 11/2008 | Abe | 348/349 |
| 2009/0041445 A1 * | 2/2009 | Yoshida et al. | 396/121 |

FOREIGN PATENT DOCUMENTS

JP 5-328197 12/1993

OTHER PUBLICATIONS

International Preliminary Report on Patentability issued Aug. 25, 2011 in International (PCT) Application No. PCT/JP2009/007103.

* cited by examiner

*Primary Examiner* — Nicholas Giles
(74) *Attorney, Agent, or Firm* — Wenderoth, Lind & Ponack, L.L.P.

(57) ABSTRACT

An imaging apparatus includes an imaging unit operable to capture a subject to generate an image, a subject detector operable to detect the subject from the generated image, a display unit operable to display the generated image and a mark indicating the subject detected by the subject detector, an operation unit operable to receive an operation for setting an operating mode to a subject selecting mode in which any position on a screen of the display unit can be selected, and a controller operable to control the display unit to cause the mark to disappear, when the operation unit receives the operation for changing the operating mode into the subject selecting mode in a state that the mark is displayed on the display unit.

5 Claims, 5 Drawing Sheets

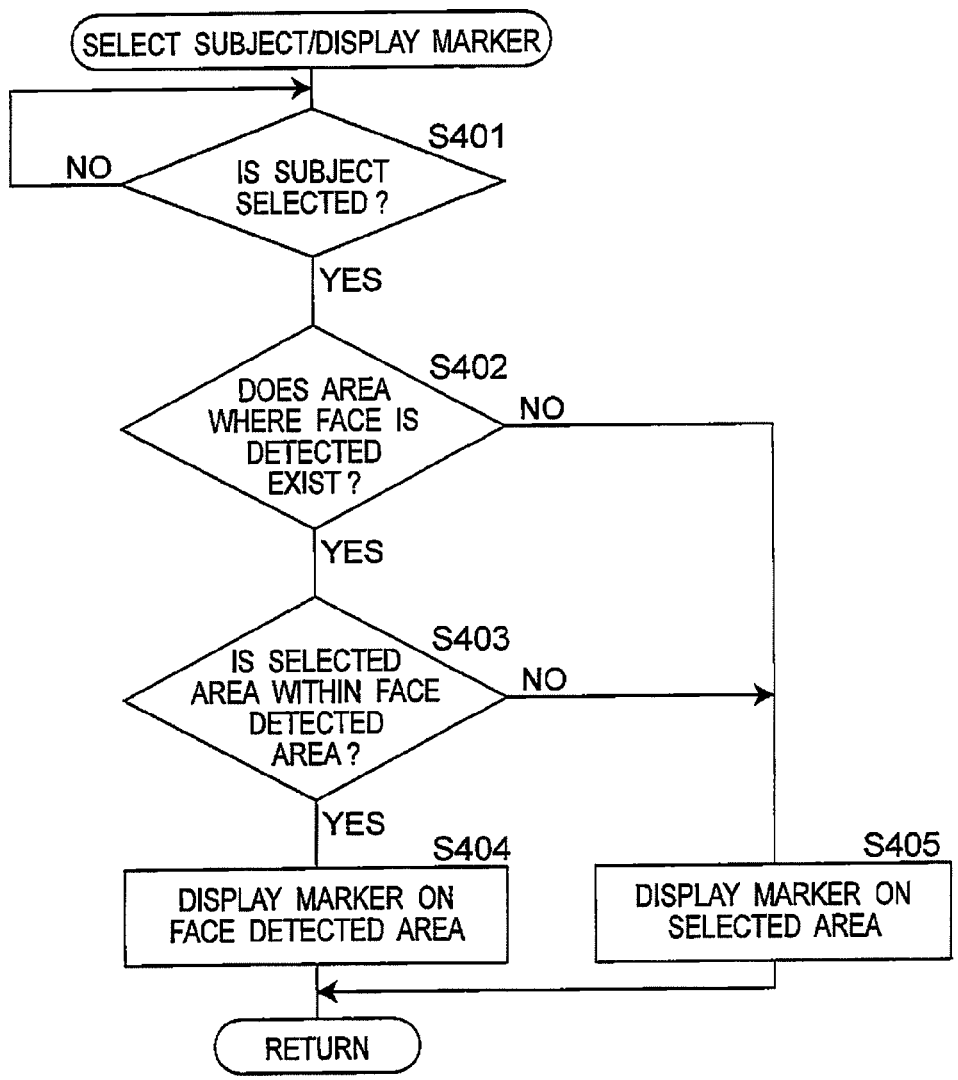

IMAGING APPARATUS WITH SUBJECT SELECTING MODE

BACKGROUND

1. Technical Field

The technical field relates to an imaging apparatus capable of recognizing a subject and displaying a display indicating the recognized subject.

2. Related Art

Conventionally, a technique is known, in which, a feature amount of a subject which a user is interested in most (hereinafter, it refers to "main subject") is obtained and an area where a main subject is present is estimated from image data based on the feature amount. Particularly, a process for sequentially obtaining an area where the main subject is present from moving image data as image data to be sequentially input operates tracing the moving main subject. For this reason, this process is mostly called a tracking process or a chasing process.

There are various imaging apparatuses which obtain a position of a main subject according to the tracking process and perform an imaging control for shooting the main subject suitably. The imaging control includes a focus control which focuses on the main subject, an exposure control which adjusts luminance of the main subject to a suitable level, and a frame control such as panning, tilting, zooming and the like which adjusts the main subject to come to the center of a screen.

JP-A-5-328197 discloses an imaging apparatus that enables easy selection of an area intended by a user when selecting a main subject in the tracking process. This imaging apparatus displays a frame on a subject recognized on a screen upon recognizing the subject, and selects an area of the subject intended by a user from areas on which the frames are displayed, based on an external operation or visual line information.

In the above imaging apparatus, however, when a determined range centered on the position specified by the user is selected as the subject area, the area of the recognized subject is displayed in advance. For this reason, even when an area other than the specified area can be set as the subject area, the user might misunderstand that only the displayed area of the recognized subject can be selected.

SUMMARY

In view of the above problem, it is an object to provide an imaging apparatus that improves user's convenience at the time when the user selects an area of a subject.

In order to solve the above problem, an imaging apparatus according to the first aspect includes: an imaging unit operable to capture a subject to generate an image; a subject detector operable to detect the subject from the generated image; a display unit operable to display the generated image and a mark indicating the subject detected by the subject detector; an operation unit operable to receive an operation for setting an operating mode to a subject selecting mode in which any position on a screen of the display unit can be selected; and a controller operable to control the display unit to cause the mark to disappear, when the operation unit receives the operation for changing the operating mode into the subject selecting mode in a state that the mark is displayed on the display unit.

In the imaging apparatus according to the first aspect, when the operation unit receives the operation for changing into the subject selecting mode, a subject can be freely selected by user due to causing the mark to disappear regardless of a result of the extraction of a candidate area of a subject. That is to say, user's convenience in user's selection of the subject area can be improved.

BRIEF DESCRIPTION OF DRAWINGS

FIG. 2B is a flowchart illustrating a process at the time of selecting a subject according to the first embodiment.

DETAILED DESCRIPTION

An embodiment will be described in detail below with reference to the drawings.

First Embodiment 1-1. Configuration of Imaging Apparatuses

Figure 1:
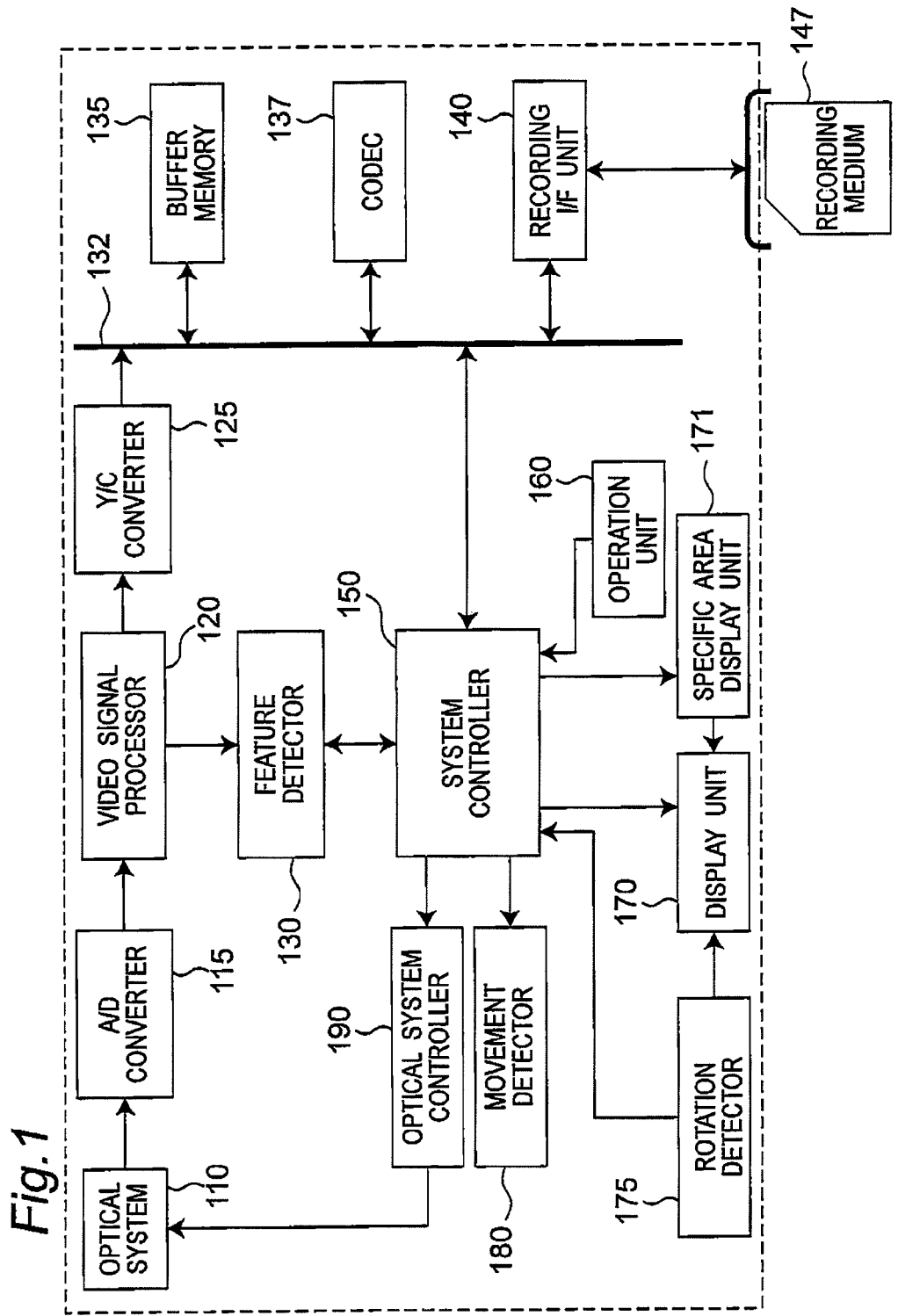
FIG. 1 is a block diagram illustrating a configuration of a video camera according to a first embodiment.

FIG. 1 is a block diagram illustrating a configuration of a video camera 100 according to the first embodiment. In FIG. 1, a range surrounded by a broken line represents the video camera 100. FIG. 1 illustrates only a block relating to the video camera 100 according to this embodiment.

The video camera 100 includes an optical system 110, an A/D converter 115, a video signal processor 120, a Y/C converter 125, a feature detector 130, a system bus 132, a buffer memory 135, a CODEC 137, a recording I/F unit 140, a socket 145, a system controller 150, an operating unit 160, a display unit 170, a specific area display unit 171, a rotation detector 175, a movement detector 180, and an optical system controller 190.

The optical system 110 includes a plurality of lenses such as focus lens moving along an optical axis in order to regulate a focus state and zoom lens moving along an optical axis in order to magnify an optical image of a subject, a diaphragm and a shutter device controlling exposure, and an imaging device converting a subject image incident through the lenses into an electric signal (video signal). The above components of the optical system 110 are arranged in a lens barrel capable of being driven in a pitching direction and a yawing direction. The optical system 110 converts the subject image into an electric signal (video signal) to output it. As the imaging device, CCD (Charge Coupled Device) image sensor or a CMOS (Complementary Metal Oxide. Semiconductor) image sensor is used.

The A/D converter 115 converts an analog video signal from the optical system 110 into a digital video signal. The video signal processor 120 gives generally-known video signal processes such as gain adjustment, noise reduction, gamma correction, an aperture process, and a knee process to the digital video signal output from the A/D converter 115. The Y/C converter 125 converts the digital video signal from a RGB format into a Y/C format. The digital video signal converted into the Y/C format by the Y/C converter 125 is accumulated as digital video information into the buffer memory 135 through the system bus 132, and is subject to a lossy compression process by the CODEC 137. The digital video signal then passes through the system bus 132 again, and is recorded in a recording medium 147 electrically connected to the socket 145 via the recording I/F unit 140.

The CODEC 137 performs DCT (discrete cosine transform) and Huffman coding to compress image data. The CODEC 137 compresses image data according to a compression format conforming to MPEG-2 and H.264 standards. Compression formats other than MPEG-2 and H.264 formats can be used. When the compressed image data is reproduced on the display unit 170, the CODEC 137 decodes the image data into an uncompressed state. The CODEC 137 generates AV data to be recorded in the recording medium 147 from compressed image data and compressed audio data that is not displayed in the first embodiment. Further, the CODEC 137 decodes the AV data recorded in the recording medium 147 to generate compressed image data and compressed audio data.

The recording I/F unit 140 can be mechanically and electrically connected to the recording medium 147. The recording I/F unit 147 reads data from the recording medium 147, and writes data into the recording medium 147. The recording medium 147 can store various data such as AV data therein. The recording medium 147 may be detachable from the video camera 100, or may be built in the video camera 100. The recording medium 147 may be a semiconductor memory card, a hard disc, a DVD (Digital Versatile Disc), a BD (Blue-ray Disc) and the like.

The system controller 150 is a control unit that entirely controls the video camera 100. The system controller 150 can be realized by a microcomputer or the like.

The operation unit 160 is an operation unit that performs various operations of the video camera 100, and is composed of various buttons, levers and the like. The various buttons include a face detecting button for starting a face detecting operation, and a subject selecting button for setting the video camera 100 into a subject selecting mode. A user refers to a video being captured on the display unit 170 and simultaneously can give various instructions to the video camera 100 through the operation unit 160. The display unit 170 is a small liquid crystal (LCD) panel, or EVF (Electric View Finder). The liquid crystal panel of the display unit 170 can be rotated, and when it is rotated by the user, which is informed by the rotation detector 175 to the system controller 150. Video data to be displayed on the display unit 170 is created by the system controller 150. The system controller 150 zooms out the image data stored in the buffer memory 135 so that the image data complies with resolution of the display unit 170. The system controller 150 superimposes various icons for instinctively understanding the operating states of the video camera 100 on the zoomed-out video to output it to the display unit 170. Further, when the face detecting button composing the operating unit 160 is pressed down, the system controller 150 superimposes a signal from the specific area display unit 171 for displaying a feature detected by the feature detector 130 on the video to output the video to the display unit 170. The display unit 170 has a touch panel function, and the user touches the display unit 170 to be capable of selecting and specifying a partial area of an image.

The movement detector 180 is composed of an angular velocity sensor and an A/D converter. The movement detector 180 detects movements of the video camera in the yawing direction and the pitching direction in the system controller 150 based on an output signal from the angular velocity sensor.

1-2. Process for Extracting Main subject

A process for extracting an area of a main subject will be described below. The feature detector 130 extracts an area on an image where the main subject is much likely to present based on a feature amount of the main subject. In this embodiment, the main subject is a face, and the feature amount of the main subject represents likelihood of the face, for example. The feature amount of the main subject is fixedly stored in a ROM (Read Only Memory) in the feature detector 130. The feature detector 130 compares a digital video signal to be input with the feature amount of the main subject stored in the ROM. The digital video signal to be input is suitably subject to an image zooming-out process, and is stored as one piece of image data in a memory (not shown) of the feature detector 130, to be compared with the feature amount of the main subject. As the method for extracting the area of the main subject, a method called template matching, for example, is used. In this method, a group of pixels of the area of the main subject is set as the feature amount of the main subject, and candidate areas of a plurality of subject areas set in the image data are compared for each pixel. The candidate area with highest similarity is set as the area of the main subject. The candidate area of the subject is selected from the areas in a certain range around the position of the area of the main subject detected at the previous time. This is based on that the assumption such that the main subject does not greatly move for a short time, and this has potential for a reduction in throughput and improvement of detection accuracy because of ignorance similar subjects present in positions separated from the main subject.

In this embodiment, the main subject is a subject other than a face. The feature amount of the main subject in this case is a color of a position other than the face selected by a user. When the user selects a position other than the face, the feature amount of the main subject is stored as one image data into the memory, not shown, in the system controller 150. In this case, the feature detector 130 compares the digital video signal to be input with the image data stored in the memory, not shown, in the system control 150, to execute the process for extracting the area of the main subject.

The above various techniques relating to the detection of the main subject have been researched and developed for a long time. As the methods for detecting the feature amount of the subject and detecting the subject, various methods can be used, and a plurality of methods may be combined to be used.

The system controller 150 tracks the area detected by the feature detector 130 and the selected area based on the result of detection in the movement detector 180 and the like.

1-3. Correspondence Relationship

The configuration including the optical system 110 and the video signal processor 120 is one example of an imaging unit. The feature detector 130 is one example of a feature detector. The display unit 170 is one example of a display unit. The operation unit 160 is one example of an operation unit. The system controller 150 is one example of a control unit. The operation unit 160 is one example of a subject selecting operation unit.

2. Operation

An operation of the video camera 100 at the time of selecting the subject will be described with reference to flowcharts of FIGS. 2A and 2B. The display unit 170 of the video camera 100 displays a video that is being captured and is generated by the optical system 110, the A/D converter 115, the video signal processor 120 and the Y/C conversion.

Figure 2A:
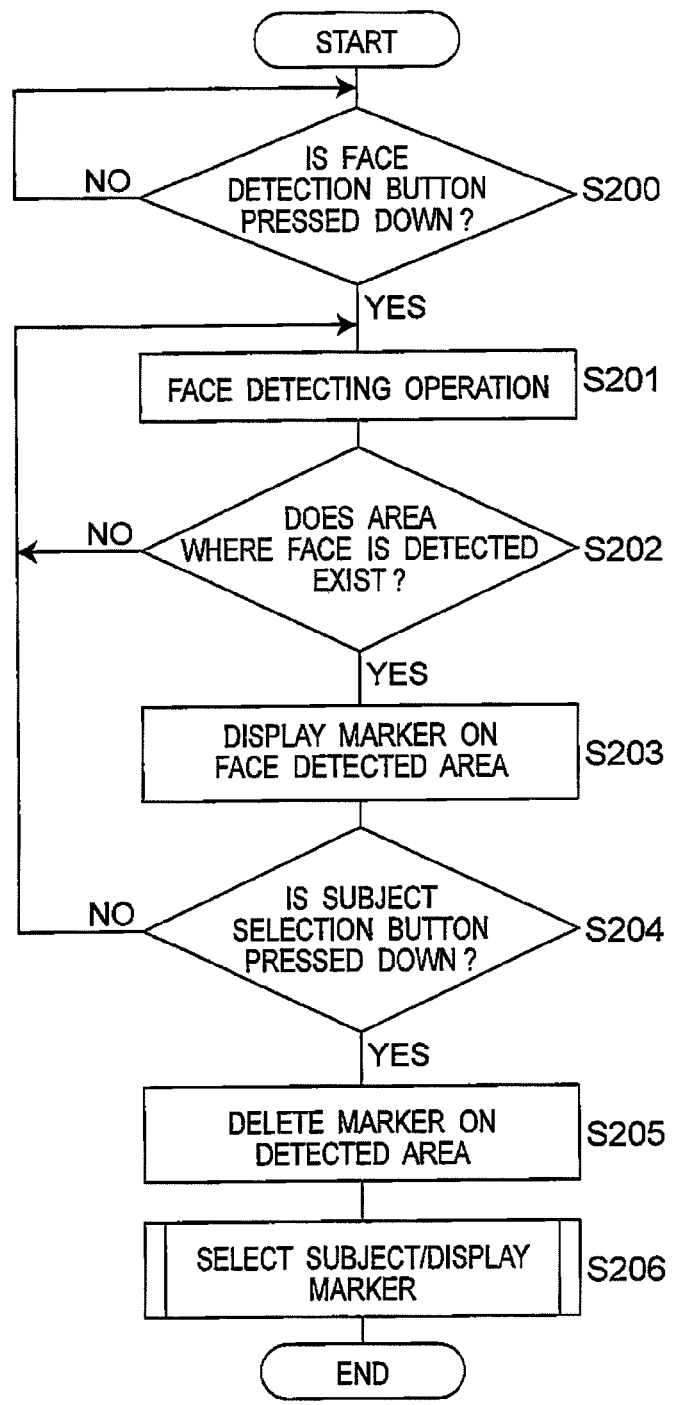
FIG. 2A is a flowchart illustrating a process at the time of selecting a subject according to the first embodiment.

In FIG. 2A, when the user presses down the face detection button composing the operation unit 160, the feature detector 130 starts the face detection operation (YES at S200). As a result, the feature detector 130 performs the face detection operation on image data from the video signal processor 120 (S201).

Figure 3A:
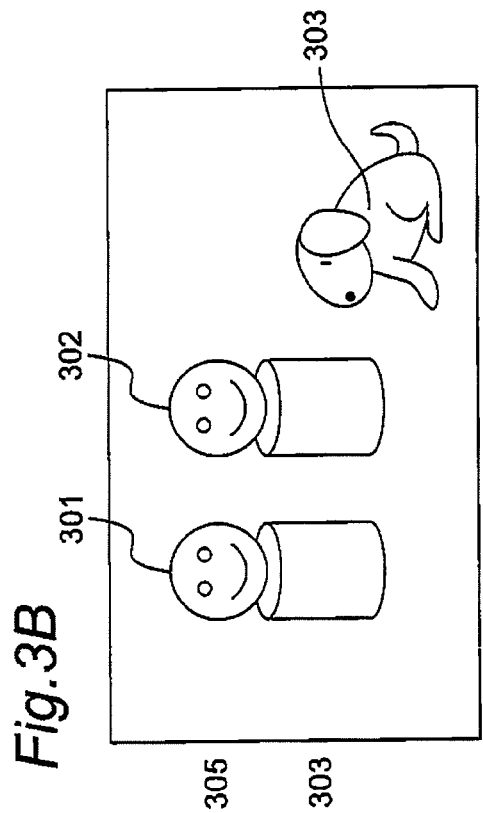
FIG. 3 is diagram illustrating display example by a display unit at the time of displaying candidates of main subjects according to the first embodiment.

The system controller 150 checks if an area where the face is detected by the feature detector 130 is present (S202). When the area where the face is detected by the feature detector 130 is not present (NO at S202), the system controller 150 continues the face detection operation (S201). When the area where the face is detection is present (YES at S202), the system controller 150 displays a marker on the detected area using the specific area display unit 171 (S203). Concretely, the specific area display unit 171 outputs an image on which the marker is superimposed to the display unit 170. For example, as shown in FIG. 3A, markers 304 and 305 are displayed on areas 301 and 302 where the faces are detected.

Figure 3B:
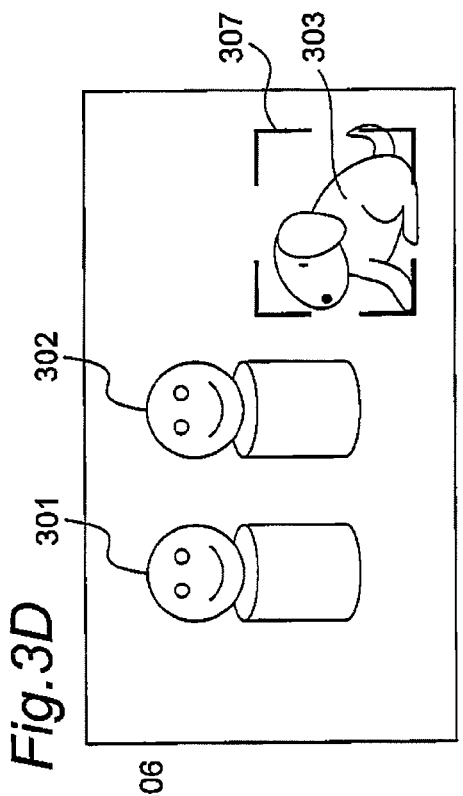

Thereafter, the system controller 150 detects whether the subject selecting button composing the operation unit 160 is pressed down (S204). When the subject selecting button is pressed down (YES at S204), the system controller 150 transits the video camera 100 into the subject selecting mode, and clears the markers 304 and 305 of the detected area by the specific area display unit 171 which are superimposed to be displayed on the display unit 170 (S205) disappear. That is to say, when the subject selecting button is pressed down, the system controller 150 allows the areas indicated by the markers 304 and 305 shown in FIG. 3A to disappear as shown in FIG. 3B. When the markers 304 and 305 are cleared, the user recognizes that not only the subjects 301 and 302 indicated by the markers 304 and 305 but also a subject 303 that is not indicated by a marker can be selected on the display screen of the display unit 170 shown in FIG. 3B. When the subject selecting button is not pressed down (NO at S204), the system controller 150 returns to step S201 to perform the above operation. In such a configuration, the user presses down the subject selecting button to make the markers 304 and 305 on the areas where the faces are detected by the feature detector 130 disappear. With this configuration, the user can recognize that not only the areas indicated by the markers but also a subject that is not indicated by a marker can be freely selected. The subject selected by the user in the subject selecting mode is subject to undergo automatic focus, and is a subject to undergo the tracking process.

After the system controller 150 clears the markers 304 and 305 on the areas detected by the specific area display unit 171, it waits until the user selects a target subject from the subjects displayed on the display unit 170 in the subject selecting mode. When the subject is selected, a marker in accordance with the selected subject is displayed (step S206).

Details of the control at step S206 will be described with reference to the flowchart of FIG. 25.

The system controller 150 determines whether the user selects a subject that is desired to be recognized in the image displayed on the display unit 170 (S401). When the display unit 170 has a touch panel function, the user can touch the subject displayed on the display unit 170 to select the subject. When the display unit 170 does not have the touch panel function, the user operates a cross key or the like of the operation unit 160 to move a pointer displayed on the display unit 170. When the pointer indicates the subject desired to be selected, the user presses down a determination button or the like of the operation unit 160 to be capable of selecting the subject.

When the subject is selected (YES at S401), the system controller 150 determines whether the area where the face is detected by the feature detector 130 is present (S402).

When the area indicating the face detected by the feature detector 130 in advance is present (YES at S402), the system controller 150 determines whether the area selected by the user is within the area indicating the face (S403).

Figure 3C:
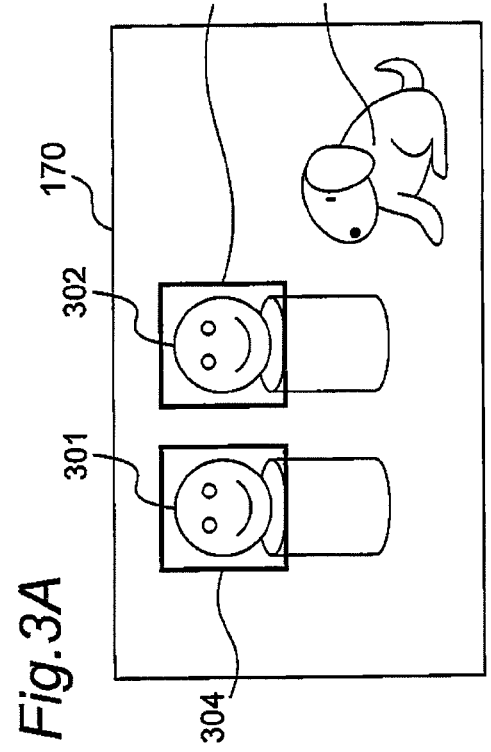
Figure 3D:
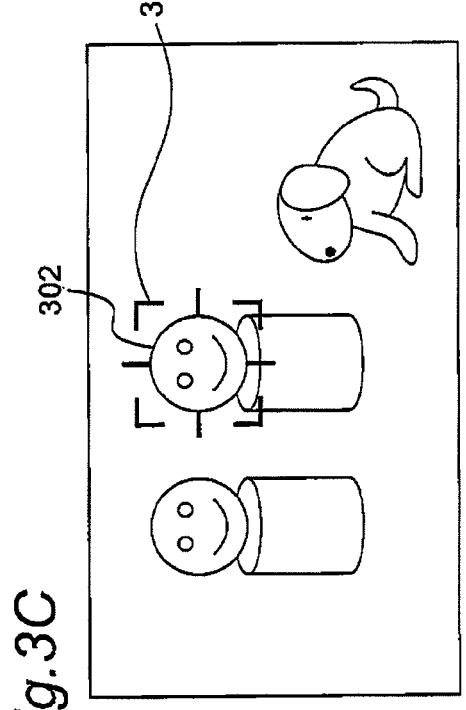

When the selected area is the face area (YES at S403), a marker is displayed on the area indicating the face (S404). At this time, the specific area display unit 171 outputs an image on which the marker is superimposed to the display unit 170. For example, when the user selects a partial area of the face of the subject 302 on the display screen shown in FIG. 33, the system controller 150 displays a marker 306 on the entire face area of the subject 302 (the area detected as the face area at S201 in advance) as shown in FIG. 3C regardless of the actually selected position. At this time, the system controller 150 may make a display format of the marker different between a case where the area selected by the user is the face area (YES at S403) and a case where the area is not the face area (NO at S403). Concretely, shapes and frame colors of markers may be made to be different. For example, when the face area is selected, a marker 306 as shown in FIG. 3C may be displayed, and the area that does not indicate the face is selected, a marker 307 as shown in FIG. 3D may be displayed. As a result, the user can easily select the face area and satisfactorily recognize that the face area is selected.

On the other hand, when the area that indicates the face detected by the feature detector 130 in advance is not present (NO at S402), or when the selected position is not included in any face detected areas (NO at S403), the system controller 150 displays a marker on an area selected by the user (S405). At this time, particularly, the system controller 150 may make the display format (shape, frame color or the like) different between the marker to be displayed on the subject selected by the user and the marker to be displayed on the subject automatically detected. For example, the Markers to be displayed on the automatically detected subjects may be the markets 304 and 305 shown in FIG. 3A, and the marker to be displayed on the subject selected by the user may be the marker 306 shown in FIG. 3C. As a result, the user can easily recognize that the subject indicated by the marker is not automatically detected but is selected by the user.

Figure 4A:
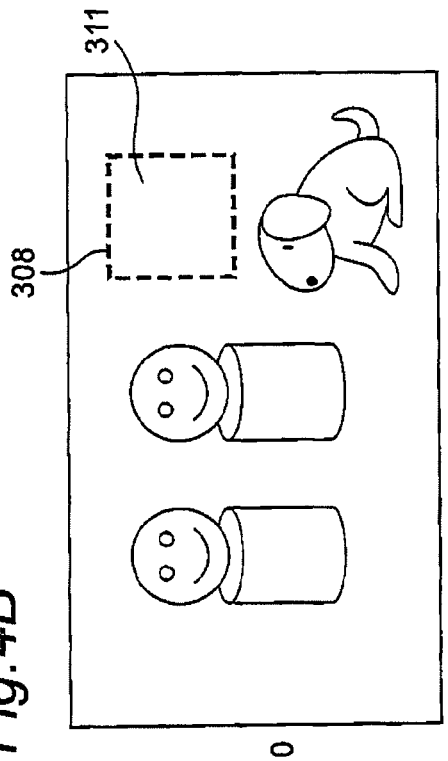
FIG. 4 is diagram illustrating display example by the display unit at the time of specifying a main subject according to the first embodiment.

When transition to the state shown in FIG. 3B occurs, a message 310 that prompts the user to select an area may be displayed as shown in FIG. 4A. As a result, the user is prompted to select an area, and can recognize that areas other than the detected areas 301 and 302 can be specified.

After the marker 306 indicating that the subject area 302 is selected is displayed as shown in FIG. 3C is displayed, when the subject area 302 moves to the outside of the imaging range and the system controller 150 cannot recognize the subject area 302, the message 301 shown in FIG. 4A may be again displayed. As a result, the user is prompted to select a subject.

Figure 4C:
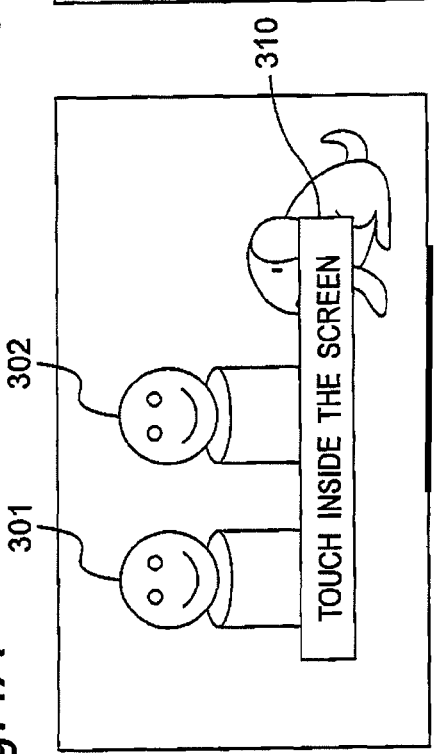
Figure 4B:
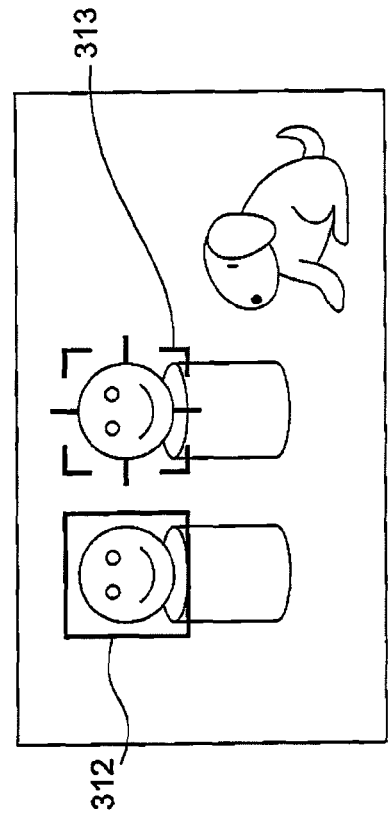

When a subject is selected on the display screen on the display unit 170 shown in FIG. 3B, and the system controller 150 cannot recognize a subject 311 selected by the user because the subject 311 is a background or the like as shown in FIG. 4B, the system controller 150 may change the display format of a marker. For example, as shown in FIG. 4B, a marker 308 indicating the subject 311 is shown by a broken line. In another manner, a color of a solid line or a broken line is lightened or is changed. When a marker different from a normal state is displayed, the user can recognize that the video camera 100 cannot recognize the selected subject. Further, this can prevent the user to select one area at many times. When a predetermined time passes after the marker 308 is displayed, the system controller 150 may blink the marker 308 and make it disappear. In this case, the system controller 150 does not display the message 310 as described above. This is because the user is prompted to select a subject by blinking the marker 308 and deleting it. Further, this is because when the message 310 is displayed after the maker 308 is blinked and is deleted, the user feels it is troublesome.

At the time when the subject is selected on the display screen shown in FIG. 33, markers 312 and 313 may be displayed simultaneously on both the automatically detected area and the selected area as shown in FIG. 4C.

3. Conclusion

In the video camera 100 according to this embodiment, when a subject is selected, a marker on an area where a face is detected by the feature detector 130 is brought into a non-display state. As a result, the user can recognize that not only an area where a maker is displayed but also any subject area on the display screen can be selected. As a result, the user can freely specify a subject without sticking to a result of extracting subject candidates.

In the video camera 100 according to this embodiment, the display of a subject is made to be different between the case where a determined subject is the main subject and the case where a subject selected by a user is the main subject. As a result, the user can satisfactorily recognize that the subject selected by the user is the subject selected by him/herself. That is to say, this can improve user's convenience of the selection of a subject area.

The preferred embodiment is described above. This form is not limited to the above embodiment, and various modifications can be made without departing from the scope of the embodiment.

The imaging apparatus according to the embodiment can improve the user's selectivity of a subject area, and is useful for various imaging apparatuses such as a digital camera and a digital video camera.

What is claimed is:

1. An imaging apparatus, comprising:
   an imaging unit operable to capture a subject to generate an image;
   a subject detector operable to detect the subject from the generated image;
   a display unit operable to display on a screen the generated image and a mark indicating the subject detected by the subject detector;
   an operation unit operable to receive an operation for changing from an operating mode to a subject selecting mode in which any position on the screen of the display unit is selectable; and
   a controller operable to control the display unit to cause the mark to disappear, so that no mark is displayed in the image on the screen of the display unit until any position on the screen of the display unit is selected after the mark has disappeared, when the operation unit receives the operation for changing the operating mode into the subject selecting mode and while in a state that the mark is displayed on the screen of the display unit.

2. The imaging apparatus according to claim 1, wherein the controller causes the display unit to display a message for prompting a user to select a subject on the generated image upon disappearance of the mark.

3. The imaging apparatus according to claim 2, wherein after the message is displayed, the controller controls the display unit to cause the message to disappear when a predetermined time elapses, and when the subject selected by the user cannot be recognized after the control unit controls the display unit to cause the message to disappear, the control unit causes the display unit to display the message again.

4. The imaging apparatus according to claim 1, further comprising a tracking unit operable to recognize and track the subject selected in the subject selecting mode,
   wherein when the tracking unit cannot track the subject after the subject is selected in the subject selecting mode, the controller causes the display unit to display a message for prompting the user to select the subject on the generated image on the display unit.

5. An imaging apparatus, comprising:
   an imaging unit operable to capture a subject to generate an image;
   a subject detector operable to detect the subject from the generated image;
   a display unit operable to display on a screen the generated image and a mark indicating the subject detected by the subject detector; and
   a controller operable to control the display unit to cause the mark to disappear, so that no mark is displayed in the image on the screen of the display unit until any position on the screen of the display unit is selected after the mark has disappeared, when a subject selecting mode in which any position on the screen of the display unit is selectable is set and while in a state that the mark is displayed on the display unit.

* * * * *